Feb. 23, 1971  A. G. BOISSEVAIN ET AL  3,565,530

OPTICAL MACHINE TOOL ALIGNMENT INDICATOR

Filed Dec. 28, 1967  2 Sheets-Sheet 1

*INVENTORS*
ALFRED G. BOISSEVAIN
BYRON W. NELSON

BY
ATTORNEYS

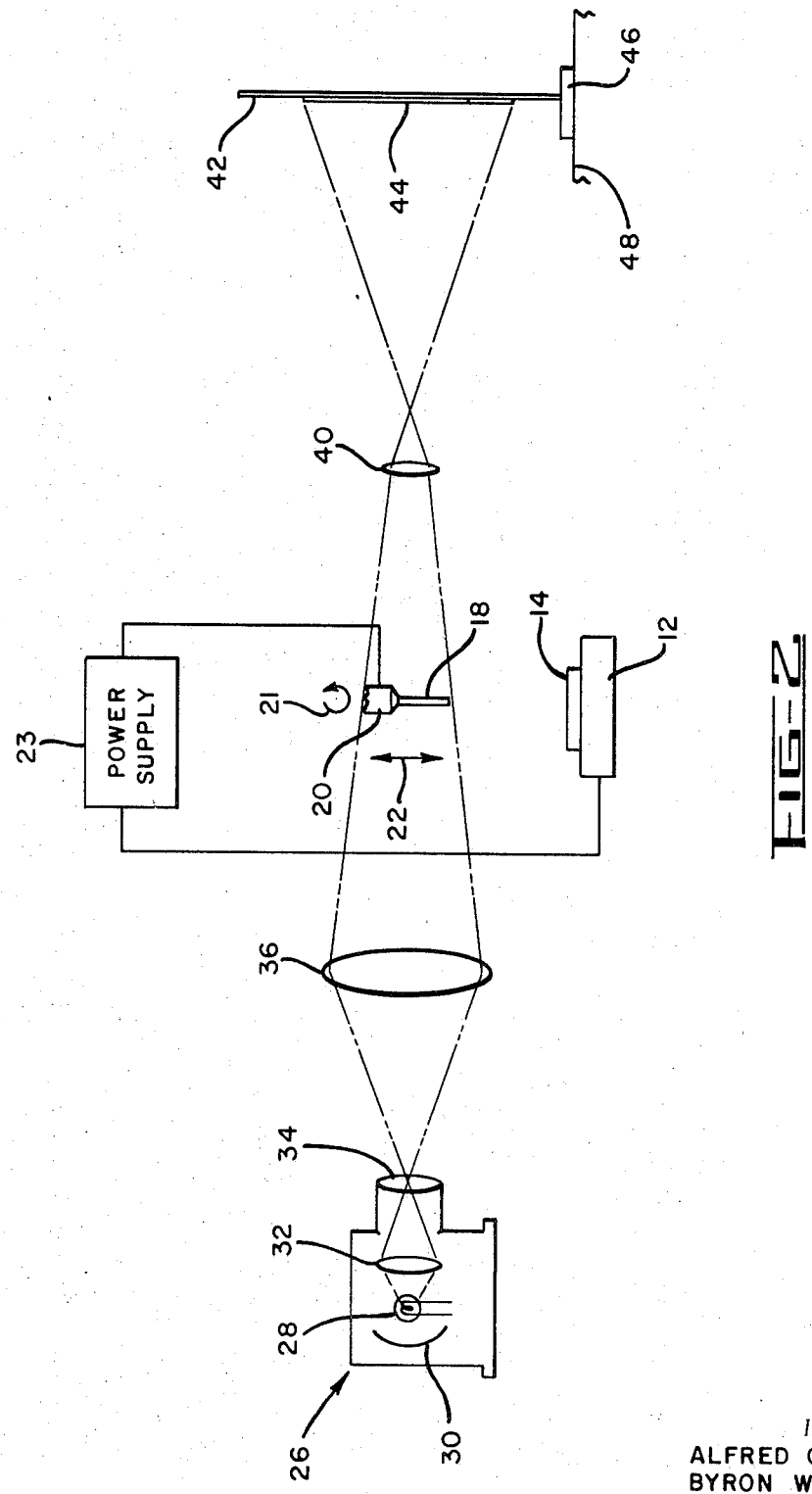

United States Patent Office 3,565,530
Patented Feb. 23, 1971

3,565,530
OPTICAL MACHINE TOOL ALIGNMENT INDICATOR
Alfred G. Boissevain, Palo Alto, and Byron W. Nelson, Santa Clara, Calif., assignors to the United States of America as represented by the Administrator of the National Aeronautics and Space Administration
Filed Dec. 28, 1967, Ser. No. 694,246
Int. Cl. G01b 11/26, 11/02, 9/08
U.S. Cl. 356—154                         5 Claims

ABSTRACT OF THE DISCLOSURE

An optical gauging instrument for checking the alignment of a machine element such as the electrode of an electrical discharge machine, comprising a light source which provides a beam of light projected along a path to fall upon a viewing screen. The electrode is located in the path of the beam whereby an image thereof is projected on the screen. A lens, or lenses, are positioned between the light source and electrode to concentrate the beam on the electrode, and a projection lens may be positioned between the electrode and screen for producing an enlarged image on the screen. The screen preferably is movable and may be positioned at an oblique angle with the optical axis of the system for further enlargement of at least one dimension of the electrode image on the screen.

---

The invention described herein was made by an employee of the United States Government and may be manufactured and used by or for the Government for governmental purposes without the payment of any royalties thereon or therefor.

This invention relates to an optical gauging system and more particularly to a non-contacting system for gauging, inspecting and monitoring the alignment of a machine element. Although the invention is described hereinbelow for use with an electrical discharge machine for checking alignment of a wire electrode carried thereby, it is not limited to such use, and may be used in checking the position and alignment of other machine tool parts, and the like.

The electrode used in a machine for electrical discharge machining of metal stock must be straight for accurate machining. Prioring art arrangements require that the electrode be removed from the machine and checked for straightness either by use of a flat plate or by use of a contour projector. Disadvantages of such prior art methods of alignment include the fact that the methods require much time, and that the electrode may be bent when installing or reinstalling the same in the machine thereby necessitating removal and realignment. Further, with some contour projectors only a portion of the electrode may be viewed at any one time. Furthermore, there is no positive method of checking the alignment with the electrode in place on the machine with these prior art methods and apparatii which require removal thereof from the machine.

An object of this invention is the provision of an alignment apparatus for checking the alignment of machine elements such as electrodes, which apparatus avoids the above-mentioned disadvantages of prior art means.

An object of this invention is the provision of an optical alignment apparatus by means of which the alignment of a machine element may be checked with the element in place on the machine.

An object of this invention is the provision of an optical alignment apparatus which allows for the checking and adjusting of the alignment of a machine element while the element is in place on the machine and which apparatus does not interfere with normal machine operation.

An object of this invention is the provision of an optical gauging system for projecting a magnified shadow of a machine element such as an electrode on a screen, the magnification of which shadow is readily variable over a wide range.

An object of this invention is the provision of an optical gauging system for alignment of the electrode of an electrical discharge machine by means of which system the position of an adjusting tool on the electrode is also viewable to facilitate the alignment process.

The above and other objects and advantages of the invention are achieved by means of an optical system comprising a light source for providing a beam of light which is projected along a light path to fall upon a viewing surface such as a screen. The machine electrode is located in the path of the beam whereby an image of the electrode is projected onto the screen. A lens or lens system, is included between the light source and electrode to concentrate the beam on the electrode and a projection, or image forming lens, is included between the electrode and screen for producing an image of the electrode on the screen. The screen is adjustably positioned and may be positioned at an oblique angle with respect to the optical axis of the system to provide added magnification of the image in one dimension without further magnifying the image in a dimension at right angles thereto. In particular, the lateral dimension of the electrode image may be greatly magnified without increasing the image in the longitudinal direction of the electrode. In this way, the screen does not have to be placed at a great distance from the electrode to obtain the desired magnification of lateral deviations of the electrode image or shadow.

The invention will be better understood from the following description when taken in conjunction with the accompanying drawings. In the drawings, wherein like reference characters denote the same parts in the several views:

FIG. 2 is a diagrammatic representation of the optical alignment system shown in FIG. 1;

Figure 1:
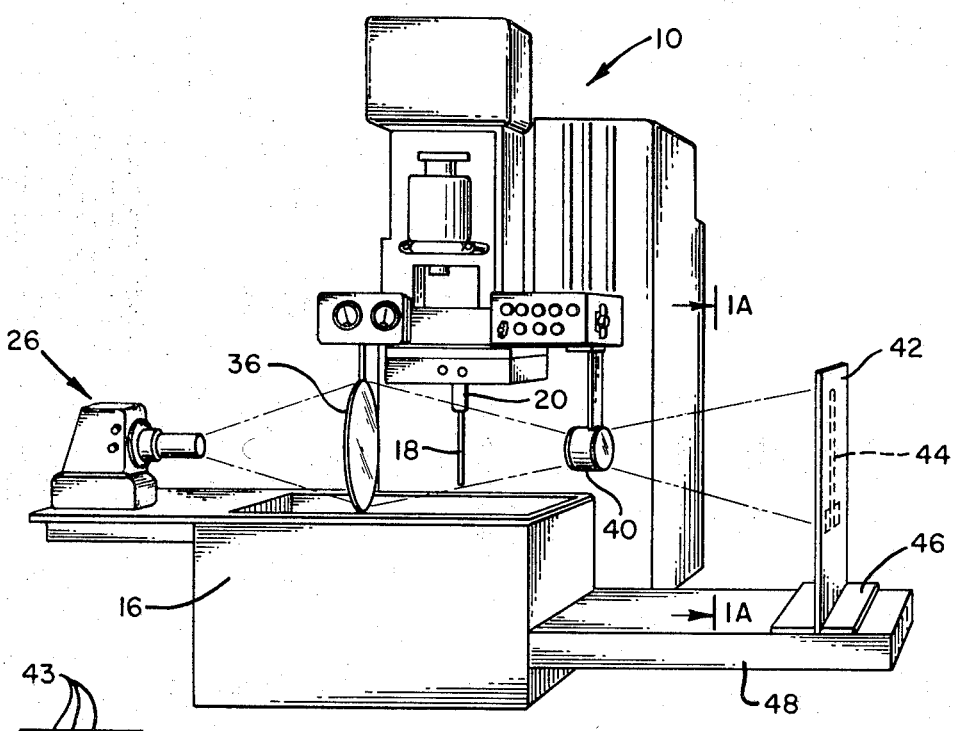
FIG. 1 is a perspective view of an electrical discharge machining apparatus showing the novel optical alignment system of this invention applied thereto.

Reference is now made to FIG. 1 wherein there is shown an electrical discharge machining apparatus 10 of conventional design. As shown in FIG. 2, a typical electrical discharge machining device includes a bed 12 upon which the workpiece of metal stock 14 to be machined by electrical discharge is mounted. A tank 16 (FIG. 1) surrounds the stock 14 at the sides thereof and contains a dielectric fluid in which the workpiece is normally submerged in the machining process.

The electrode 18 for machining the stock is carried by a chuck 20 which is both rotatably and vertically movable (as illustrated by the arrows 21 and 22, respectively, in FIG. 2). As diagrammatically shown in FIG. 2, a power supply 23 is connected to the electrode 10 and stock 12 to provide the necessary potential for spark machining the stock. In operation, the spark erodes the workpiece to produce a hole, or cavity therein of slightly greater size than the electrode but of a corresponding configuration. Generally, the electrode is of a non-cylindrical shape for producing a hole or cavity of a corresponding shape. The chuck, of course, is lowered, but not rotated, during the machining process. It will be apparent that the electrode 18 must be positioned in axial alignment with the vertically movable chuck to provide for accurate location of the electrode as the chuck is lowered during the machining process. Any misalignment or curvature of the electrode would result in an undesired, oversize aperture in the workpiece.

The novel optical alignment system of this invention includes a light source 26 which may comprise a projector of conventional design. As seen in FIG. 2, the projector includes a lamp 28 energized from a source of power, not shown. Light from the lamp 28, and reflected light from a concave mirror 30 behind the lamp, is directed to a condensing lens 32 (or lens system). The rays from the condensing lens 32 converge at the projection or enlarging, lens 34, and are directed to a condensing lens 36 intermediate the projector 26 and electrode 18. The condensing lens 36 (or lens system, if desired) may be of any suitable type, including a lens of the Fresnel type.

Substantially all of the light available from the projector 26 is directed onto the condensing or enlarging lens 40. The chuck 20 may be raised to a position wherein the entire exposed portion of the electrode 18 and preferably a portion of the chuck 20, are included in the cone of rays from the condensing lens 36. The optical system including the lenses 36 and 40 are arranged such that the electrode occupies substantially a maximum possible cross-sectional area of the light cone for maximum illumination thereof. That is, the electrode is arranged to subtend a maximum possible portion of the light from the condensing lens 36.

Substantially all of the light which passes the electrode and chuck also passes through the projection lens 40 (or lens system if desired) from whence it is directed upon a viewing surface 42, such as a screen. The shadow 44, which comprises an enlarged image of the electrode is thereby projected on the screen. By using a projection lens system 40 instead of a single lens thereat, improved image resolution is provided.

Figure 1A:
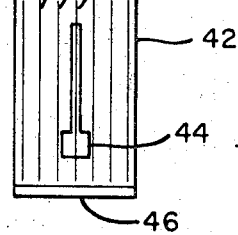
FIG. 1A is a front view of the viewing screen as taken along line 1A—1A of FIG. 1.

In the illustrated arrangement the screen is provided with a base 46 for supporting the screen in an upright position. The base simply may rest upon the flat upper surface of a supporting table 48 extending from the machine. As seen in FIG. 1A, one or more vertical calibration lines 43 are included on the screen to serve as a guide in detecting lateral excursions of the electrode image. If desired, a guideline may be drawn on the screen by marking the screen at the center line of the electrode holder image as the electrode holder is lowered or raised.

With the illustrated arrangement, the image of any tool, not shown, used for straightening the electrode 18 while it is carried by the machine also will be projected on the viewing surface 42 to facilitate locating the tool with respect to the electrode. By rotating the chuck, deviations of the electrode from the chuck axis in any lateral direction may be detected, and corrected. Since there is no physical contact with the electrode by the optical system, the measuring technique does not affect the position of the electrode.

Figure 3:
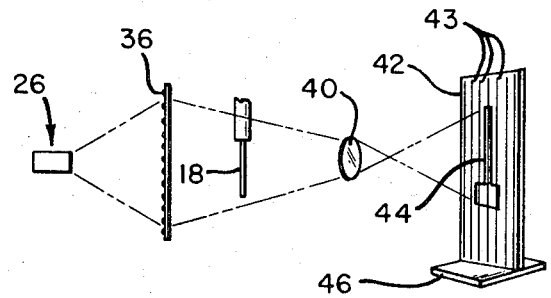
FIG. 3 is a simplified diagrammatic representation which is similar to that of FIG. 2 but showing the viewing screen at an oblique angle to the optical axis of the system for magnifying the lateral dimensions of the electrode image.

In accordance with one feature of this invention the screen may be mounted, or positioned, at an oblique angle with the optical axis of the system, such as illustrated in FIG. 3, whereby the transverse dimensions of the electrode image are further magnified thereby further magnifying any lateral excursions of the image. Obviously, the greater the screen angle departs from a position normal to the optical axis, the greater the transverse dimensions of the electrode image.

Figure 4:
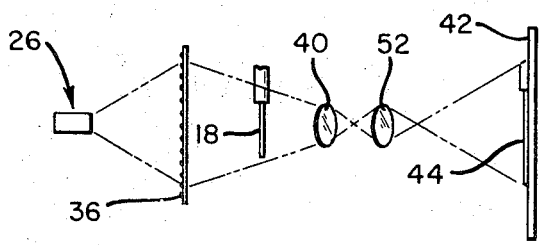
FIG. 4 is a representation which is similar to that of FIG. 3 and including an erecting lens for providing an upright shadow of the electrode on the viewing screen.

The invention having been described in detail in accordance with the requirements of the Patent Statutes, various changes and fodifications may suggest themselves to those skilled in this art. For example, as shown in FIG. 4, an erecting lens 52 may be located between the lens 40 and screen, to provide an upright image of the electrode on the screen.

Figure 5:
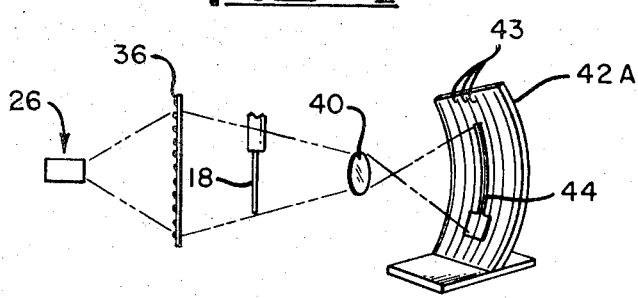
FIG. 5 is a view which is similar to that of FIG. 3 but showing a curved viewing screen positioned at an oblique angle to the optical axis.

Also, it will be apparent that a sharp image of the electrode is obtained on a flat screen, such as the screen 42, only if the lenses are properly formed or corrected for aberration, astigmatism, and other such defects. With imperfections in the lenses, the image is blurred; particularly at the upper and lower opposite ends thereof which are at the greatest distance from the optical axis. To compensate for such defects (and permit the use of less costly lenses) a curved screen may be employed, such as the screen 42A shown in FIG. 5. The screen is generally in the form of a section of a cylinder to bring the upper and lower ends of the electrode image into better focus thereon. As with the flat screen one or more guidelines 43 are formed thereon for detecting lateral excursions of the electrode image. Also, the curved screen may be positioned at an oblique angle to the optical axis, as illustrated, in the same manner as the flat screen, in order to magnify lateral excursions of the electrode image. It is intended that the above and other such changes and modifications shall fall within the spirit and scope of the invention as defined in the appended claims.

We claim:

1. An optical gauging system for checking the alignment of an elongated electrode of an electrical discharge machining device comprising:
   a light source,
   a viewing screen upon which light from the source is directed, said electrode being disposed in the path of light from the source whereby a shadow of the electrode is cast upon the viewing screen, wherein said path of light corresponds with the optical axis of the system,
   said viewing screen having a flat viewing surface at an oblique angle with the optical axis of the system for increased magnification of the electrode image on the screen in the transverse dimension of the electrode and of lateral deviations thereof, and
   projection lens means between the electrode and viewing screen to provide an image of the electrode on the screen, said viewing screen having at least one calibration line thereon extending in the direction of the longitudinal axis of the electrode image.

2. An optical gauging system for checking the alignment of an elongated electrode of an electrical discharge machining device comprising:
   a light source,
   a viewing screen upon which light from the source is directed, said electrode being disposed in the path of light from the source whereby a shadow of the electrode is cast upon the viewing screen wherein said screen is curved in the form of a section of cylinder to provide a sharper electrode image on the screen, wherein said path of light corresponds with the optical axis of the system, and
   projection lens means between the electrode and viewing screen to provide an image of the electrode on the screen, said viewing screen having at least one calibration line thereon extending in the direction of the longitudinal axis of the electrode image.

3. The optical gauging system as defined in claim 2 wherein said curved screen is positioned at an oblique angle with the optical axis of the system for increased magnification of the electrode image in the transverse dimension of the electrode and of lateral deviations thereof.

4. An optical gauging system for checking the alignment of an element of a machine or the like, said system comprising:
   a light source,
   a viewing surface upon which light from the source is directed, said light being directed along a path which corresponds to the optical axis of the system,
   said viewing surface being positioned at an oblique angle to the optical axis of the system for enlargement of the lateral dimensions and deviations of the machine element without further magnification of the longitudinal dimensions thereof,
   said machine element being disposed in the path of light from the light source and the shadow of the machine element falling upon the viewing surface to provide an image of the machine element on the viewing surface.

5. An optical gauging system for checking the alignment of an elongated electrode of an electrical discharge machining device comprising:
   a light source,
   a viewing of the screen upon which light from the source is directed, said electrode being disposed in the path of light from the source whereby a shadow of the electrode is cast upon the viewing screen, wherein said path of light corresponds with the optical axis of the system,
   said viewing screen having a flat viewing surface at an oblique angle with the optical axis of the system for increased magnification of the electrode image on the screen in the transverse dimension of the electrode and of lateral deviations thereof,
   projection lens means between the electrode and viewing screen to provide an image of the electrode on the screen, said viewing screen having at least one calibration line thereon extending in the direction of the longitudinal axis of the electrode image, and
   condensing lens means between the light source and electrode to form a cone of the light from the light source in which cone said electrode may be positioned

References Cited

UNITED STATES PATENTS

| | | | |
|---|---|---|---|
| 2,485,355 | 10/1949 | Brennan | 356—164X |
| 2,614,368 | 10/1952 | Polk et al. | 356—164X |
| 3,029,690 | 4/1962 | Jackson | 353—80X |
| 2,799,206 | 7/1957 | Fuller | 356—165 |
| 3,077,815 | 2/1963 | Coakley | 356—165X |

RONALD L. WIBERT, Primary Examiner

P. K. GODWIN, JR., Assistant Examiner

U.S. Cl. X.R.

356—171, 164, 172; 350—9